Dec. 9, 1969            A. W. THIEL            3,482,281

APPARATUS FOR MAKING THIN-WALLED PLASTIC ARTICLES

Filed Aug. 23, 1966            2 Sheets-Sheet 1

INVENTOR.
A. W. Thiel
BY
Karl J. Ross
Attorney

United States Patent Office 3,482,281
Patented Dec. 9, 1969

3,482,281
APPARATUS FOR MAKING THIN-WALLED
PLASTIC ARTICLES
Alfons W. Thiel, 63 Kaiserstrasse,
6500 Mainz (Rhine), Germany
Filed Aug. 23, 1966, Ser. No. 574,423
Int. Cl. B29c 17/00
U.S. Cl. 18—19                     12 Claims My present invention relates to the manufacture of thin-walled plastic articles having major portions of substantially planar shape, such as dinner plates, dishes and similar shallow receptacles.

In the formation of such articles from a flat sheet of thermoplastic material, e.g. by an apparatus of the type generally described in my prior U.S. Patent No. 3,115,677 issued Dec. 31, 1963, it is sometimes found that the flat bottom portions are deformed from precise planarity after the heated sheet is pneumatically (by blowing and/or suction) brought into contact with a mold surface representing the negative or the positive of the desired article. I have determined that the reason for this deformation lies in the fact that the preheated, highly pliable sheet material, on coming into contact with a relatively cold mold surface which is to give the article its shape, experiences a certain degree of thermal stressing because of the temperature differential between the mold-contacting side and the exposed opposite side of the sheet so that large flat or nearly flat sheet portions will have a tendency to warp. In the case of articles of predominantly convex or concave shape, on the other hand, these thermal stresses are generally not objectionable and, in fact, may help stabalize the finished article against undesirable deformation.

The general object of my present invention is to provide a means for so carrying out the deformation of a thermoplastic sheet, in the manufacture of articles with large planar or nearly planar surface portions, that the warping effect just described is practically completely eliminated.

A more particular object of this invention is to provide a technique for accelerating the hardening of the molded sheet prior to its removal from he male and/or female shaping means employed.

In accordance with a feature of this invention I interpose between the substantially flat mold surface proper and the preheated sheet an array of closely spaced projections which alone make contact with the sheet and impress upon it the general shape of the mold surface from which they rise, except for a certain embossing of the coresponding sheet surface with a pattern of tiny depressions constituting the negative of the peaks of the aforementioned projections. This embossing effect, known per se from U.S. Patent No. 2,891,280 to J.C. Politis, not only is nonobjectionable from an aesthetic viewpoint but also contributes to the structural strength of the article in terms of, for example, resistance to accidental cutting by a sharp-edged insrument such as a kitchen knife. In contradistinction to the process disclosed in the Politis patent, in which the patern is produced by contact of the partly deformed sheet with a textile or metallic fabric serving as a distributor for a high-pressure fluid effective to drive the sheet into broad-surface contact with a surrounding mold, the method of my present invention utilizes such a fabric, screen or equivalent structure on the very mold surface toward which the sheet is pneumatically pressed and/or drawn and along which it cools in order to harden in its final shape.

The sheet-contacting projections should be sufficiently numerous and close together to prevent any substantial intrusion of the thermoplastic material into the intervening spaces; I have found that, with the usual thermoplastic films, this requirement is satisfied if the spacing of the projections ranges between about 3 and 15 times the sheet thickness. The spaces between the projections form a channel system for the circulation of a cooling fluid, e.g. atmospheric air at substantially ambient temperatures, so that both the supported and the unsuppored side of the sheet may be simultaneously subjected to cooling by forced fluid circulation. Even without such circulation, the supported side of the sheet will cool substantially at the same rate as its reverse side (by a combination of heat radiation and conduction through the usually metallic projections) so that thermal stresses across the sheet will be virtually nonexistent.

In principle, my invention is applicable to both convex (male) and concave (female) mold surfaces and, in particular, to an apparatus wherein a plunger is displaceable toward the mold cavity of a die to assist in the vacuum drawing of the heated sheet toward the bottom of the cavity as disclosed in my above-identified prior patent. In such a system both the die and the piston may be formed with nozzles for the circulation of shaping and temperature-controlling fluids; in the case of the die, in particular, I have found it advantageous to connect all the nozzles thereof to a source of vacuum during the drawing stage and thereafter to remove the vacuum from certain of these nozzles so that atmospheric air or some other relatively cool fluid will be aspirated through these latter nozzles by the suction of the remaining nozzles still under vacuum, it being of course necessary to dimension these two groups of nozzles in such a way that the overall effect will still be a partial vacuum sufficient to hold the molded sheet against its array of supporting projections during this cooling stage. The nozzles of the co-operating piston may be similarly switched from conveying a heating fluid during the shaping stage to delivering a cooling fluid during the final hardening stage.

The invention will be described in greater detail with reference to the accompanying drawing in which.

Figure 5:
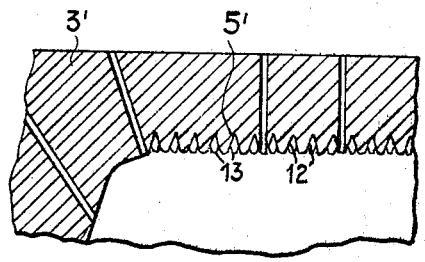
Figure 6:
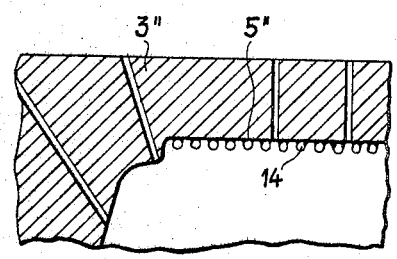
Figures 7, 8:
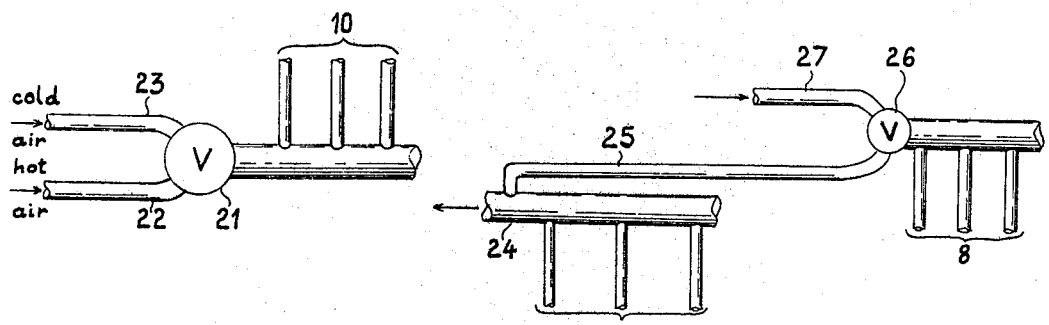
Figure 3:
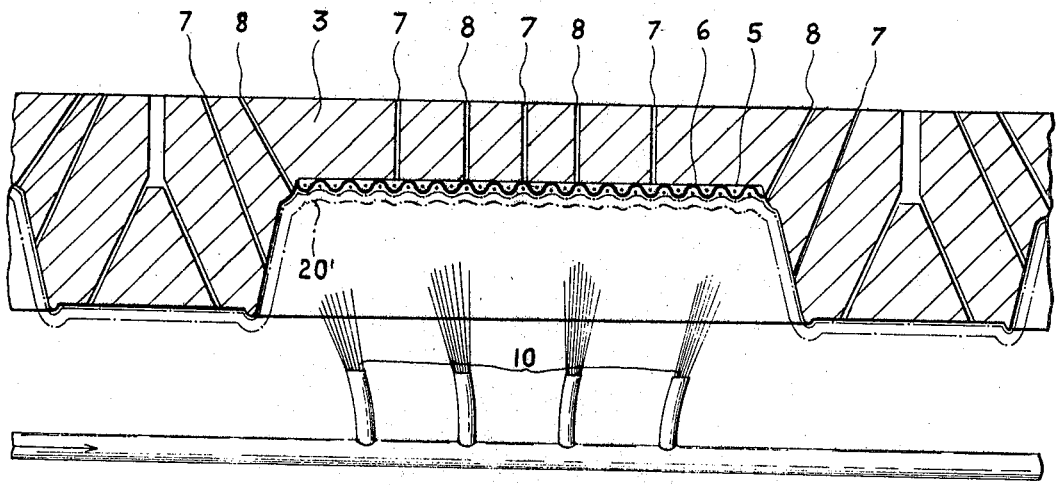
FIG. 3 is a cross-sectional view of part of the die, of tha general type shown at 111 in my above-identified U.S. patent, modified in accordance with my present improvement.
Figure 4:
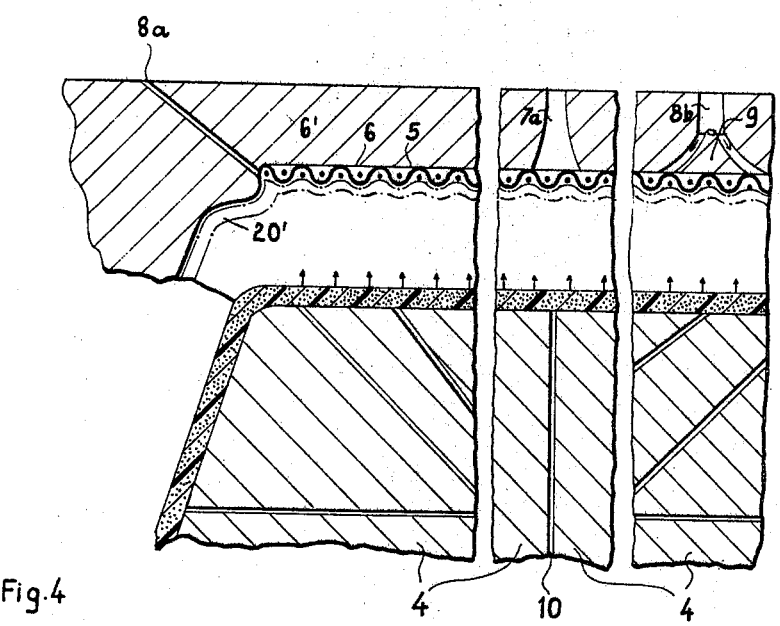
FIG. 4 is a view similar to FIG. 3 showing the combination of the die with a co-operating plunger.

FIGS. 5 and 6 are fragmentary views of dies similar to those shown in FIGS. 3 and 4 but bearing different types of sheet-supporting projections; and FIGS. 7 and 8 are diagrammatic views of the pneumatic circuits for the piston and the die, respectively, of FIG. 4.

Figure 1:
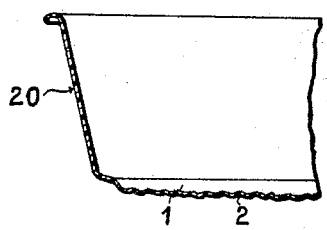
FIG. 1 is a fragmentary sectional view of an article produced in accordance with my present invention.
Figure 2:
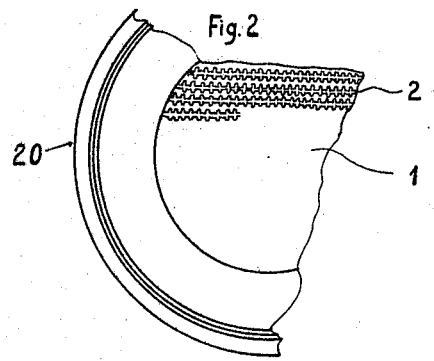
FIG. 2 is a fragmentary bottom view of the article shown in FIG. 1.

In FIGS. 1 and 2 I have illustrated part of a dish 20 with a bottom 1 having a pattern of closely spaced depressions 2 on its outer surface. These depressions, resulting from the manufacture of the article 20 by a process described hereinafter, not only strengthen the vessel in the manner previously pointed out but have the added advantage of increasing its frictional resistance with reference to a supporting surface, e.g. a kitchen table or a tray, so as to impede its sliding on such surfaces. The utensil is, furthermore, easier to hold than vessels with flat outer surfaces. Moreover, the knurling of the underside of the vessel reduces its thermal conductivity, thus allowing it to be placed with impuity on sensitive surfaces even when filled with hot foodstuffs.

In FIG. 3 I have shown a die 3 with a recess 5 defining the bottom 1 of the vessel 20 to be formed therein from a preheated sheet as generally described in my aforementioned U.S. Patent No. 3,115,677. The metallic die 3 is lined, over the entire area of its recess 5, by a metallic screen 6 whose outwardly (i.e. downwardly) extending ridges form an array of spaced projections complementary to the depressions 2 of FIGS. 1 and 2. The spacing of the crests of screen 6 should range between about 3 and 15 times the thickness of the thermoplastic sheet 20' (dot-dash lines) which is drawn into the cavity of die 3 to form the vessel 20. To facilitate such drawing, the die is formed with a number of fluid channels terminating in ports or nozzles 7 and 8 to which a source of vacuum may be connected in a manner more fully described hereinafter with reference to FIG. 8. Another set of nozzles 10' are shown disposed underneath the die 3 and trained into the cavity thereof to discharge first a hot and then a cold fluid stream against the lower or reverse side of the sheet 20', via a pneumatic circuit more fully illustrated in FIG. 7, for the purpose of helping in the deformation of the sheet and its application under pressure against the screen 6 and the periphery of the die cavity. The screen 6 may be fastened to the die 3 by soldering, e.g. as shown at 6' in FIG. 4; in order to prevent the clogging of its interstices, the screen may be reheated after soldering and cleaned by a stream of hot air.

FIG. 4 also illustrates specific configurations of the nozzles 7 and 8. A nozzle 8a, opening laterally onto the periphery of screen 6, is shown to have a constricted outlet so as to increase the velocity of a stream of cooling air which may pass through it during the final hardening of the sheet 20'. Another nozzle 7a, designed only for air aspiration, is shown to have a funnel-shaped entrance end. A further nozzle 8b, adapted like nozzle 8a for the alternate aspiration and discharge of air, has a conical distributor head 9 disposed in its flared end so as to form a plurality of diverging channels.

FIG. 4 further shows the provision of a co-operating plunger 4 having nozzles 10 which replace the stationary ports or nozzles 10' of FIG. 3. Plunger 4, movable upwardly toward the screen 6, has its working face covered by a porous layer 11 which overlies the ports 10 but does not obstruct the discharge of fluid therefrom. The interstices of layer 11 help distribute this fluid over the sheet during the initial ascent of the plunger and within the cavity of die 3 after the sheet has been drawn off the plunger into contact with screen 6.

A modified die 3', shown in FIG. 5, has an array of frustoconical projections 12 integrally rising from the bottom of its recess 5'; the peaks 13 of the projections 12 are rounded to minimize the extent of their penetration into the thermoplastic sheet. An array of orthogonal projections, such as those shown in FIG. 5, may be produced in simple manner by milling along intersecting lines.

As shown in FIG. 6, a die 3'' may have spherical projections 14 soldered to the bottom of its recess 5''.

In FIG. 7 I show a valve 21 operable to connect the nozzles 10 of FIG. 4 (or the nozzles 10' of FIG. 3) alternately to a conduit 22, leading to a supply of hot air, or a conduit 23, connected to a source of cold air which may simply be the surrounding atmosphere.

In FIG. 8 I have illustrated a conduit 24 connected to a source of vacuum (symbolized by an arrow) and multiplied to the nozzles 7 of the die; a branch line 25 extends to a valve 26 which may connect the nozzles 8 to the same source of vacuum or to a conduit 27 leading to a source of cooling fluid, e.g. again represented by the ambient atmosphere.

In operation, the preheated sheet is moved across the cavity of the die 3 whereupon, following an upward movement of the plunger 4 (if provided) to start the deformation process, valves 21 and 26 are adjusted to blow hot air through the nozzles 10 or 10' and to aspirate the air in the cavity through both sets of nozzles 7 and 8. After the sheet has made firm contact with the screen 6, or with the equivalent projections illustrated in FIGS. 5 and 6, both valves are reversed so that cooling air streams through the nozzles 10 or 10' and also through the nozzles 8 on both sides of the sheet 20' while suction is still exerted upon the sheet by ways of nozzles 7. The resulting cooling effect causes a rapid hardening of the sheet in the shape of the die cavity (considered bounded by the plane of the peaks of the supporting projections 6, 12 or 14) whereupon the hardened sheet may be extracted from the die and the article cut from the surrounding thermoplastic material in the conventional manner.

If the distributing layer 11 of plunger 4 is replaced by a grid or fabric similar to screen 6, e.g. as suggested in the aforementioned Politis patent, the bottom of vessel 20 will be knurled on both its inner and outer surfaces. It should be noted, however, that the screen of plunger 4, like the layer 11, does not contact the sheet in the final hardening stage and that, therefore, the pattern of peaks and depressions formed by it on the inner surface of the vessel may not be as sharp as the pattern which is due to the screen 6.

I claim:

1. An apparatus for making thin-walled articles with a substantially planar disk-shaped bottom, comprising mold means having a generally flat disk-shaped bottom surface conforming to the shape of a substantially planar portion of an article to be produced and an annular outwardly flared wall curving away from said bottom surface and defining a ledge therewith, said surface being formed with an array of closely spaced outwardly tapering projections in staggered rows extending over the entire area of said surface within said wall, the outer tips of said projections being separated by air spaces whose width ranges between about 3 and 15 times the thickness of said sheet, and pneumatic means for bringing a preheated and readily deformable sheet of thermoplastic material into contact with said array.

2. An apparatus as defined in claim 1, further comprising forced-circulation means for passing a cooling fluid between said projections.

3. An apparatus as defined in claim 2 wherein said mold means comprises a body with a set of nozzles terminating at said surface, said pneumatic means including a source of vacuum and conduit means connecting said source to all said nozzles, said forced-circulation means including valve means for disconnecting some of said nozzles from said source, thereby enabling the aspiration of said cooling fluid into the spaces between said projections upon a drawing of said sheet into contact with said array.

4. An apparatus as defined in claim 1, further comprising nozzle means confronting said surface for directing a stream of cooling fluid against the reverse side of said sheet upon the latter contacting said array.

5. An apparatus as defined in claim 4 wherein said pneumatic means includes valve means for alternately connecting said nozzle means to a source of heating fluid and a source of cooling fluid.

6. An apparatus as defined in claim 4 wherein said mold means comprises a concave die forming said surface and a complementary plunger movable toward said die, said nozzle means being part of said plunger.

7. An apparatus as defined in claim 6 wherein said plunger is provided with a porous layer overlying said nozzle means and confronting said die.

8. An apparatus as defined in claim 1 wherein said mold means comprises a die having a recess defining said surface, said projections being formed by a screen received in said recess.

9. An apparatus as defined in claim 8 wherein said screen and said die are metallic, said screen being soldered onto said die along said surface.

10. An apparatus as defined in claim 1 wherein said mold means comprises a body formed integral with said projections.

11. An apparatus as defined in claim 10 wherein said projections are generally frustoconical with rounded tops.

12. An apparatus as defined in claim 1 wherein said projections are generally spherical.

References Cited

UNITED STATES PATENTS

| | | |
|---|---|---|
| 1,737,874 | 12/1929 | Bush. |
| 2,362,676 | 11/1944 | Sloan. |
| 2,606,343 | 8/1952 | Cooper. |
| 2,660,757 | 12/1953 | Smith et al. |
| 2,691,798 | 10/1954 | Winchester et al. |
| 2,891,280 | 6/1959 | Polites. |
| 2,902,718 | 9/1959 | Martelli et al. |
| 3,107,396 | 10/1963 | Fowler et al. |

WILLIAM J. STEPHENSON, Primary Examiner

U.S. Cl. X.R.

18—35